US011386802B2

(12) United States Patent
Butler et al.

(10) Patent No.: US 11,386,802 B2
(45) Date of Patent: *Jul. 12, 2022

(54) LETTER MANIPULATIVE IDENTIFICATION BOARD

(71) Applicant: Learning Squared, Inc., Sunnyvale, CA (US)

(72) Inventors: Andrew Butler, Sunnyvale, CA (US); Tom Boeckle, Las Vegas, NV (US); F Brian Iannce, San Jose, CA (US); Hector Javier Farias, Castro Valley, CA (US); Carey Lee, Redwood City, CA (US)

(73) Assignee: Learning Squared, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,784

(22) Filed: Sep. 22, 2020

(65) Prior Publication Data

US 2021/0005100 A1 Jan. 7, 2021

Related U.S. Application Data

(63) Continuation of application No. 14/816,536, filed on Aug. 3, 2015, now Pat. No. 10,825,352, which is a continuation-in-part of application No. 14/730,232, filed on Jun. 3, 2015, now Pat. No. 10,607,502.

(60) Provisional application No. 62/032,630, filed on Aug. 3, 2014, provisional application No. 62/007,413, filed on Jun. 4, 2014.

(51) Int. Cl.
*G09B 17/00* (2006.01)
*G09B 19/06* (2006.01)

(52) U.S. Cl.
CPC ......... *G09B 17/003* (2013.01); *G09B 17/006* (2013.01); *G09B 19/06* (2013.01)

(58) Field of Classification Search
CPC ............................. G09B 17/003; G09B 19/06
USPC ........................................................ 434/156
See application file for complete search history.

(56) References Cited

U.S. PATENT DOCUMENTS

| | | | |
|---|---|---|---|
| 3,724,110 A | 4/1973 | Meyerson | |
| 4,101,884 A | 7/1978 | Benton, Jr. | |
| 4,131,282 A * | 12/1978 | Boyer | A63F 3/00 273/271 |
| 4,311,469 A * | 1/1982 | Bibbee | G09B 1/22 434/332 |
| 4,515,566 A * | 5/1985 | Sprague | G09B 17/00 434/172 |
| 5,306,153 A * | 4/1994 | Foster | G09B 17/00 434/167 |

(Continued)

OTHER PUBLICATIONS

"U.S. Appl. No. 16/794,570, Non Final Office Action dated Jun. 9, 2021", 16 pgs.

(Continued)

*Primary Examiner* — Thomas J Hong
*Assistant Examiner* — Sadaruz Zaman
(74) *Attorney, Agent, or Firm* — Schwegman Lundberg & Woessner, P.A.

(57) ABSTRACT

A set of letter manipulatives and a board on which said letter manipulatives may be placed, where the board comprises an identification module that can identify the letter manipulatives placed on the board and communicate the identification to a computing device.

20 Claims, 7 Drawing Sheets

(56) References Cited

U.S. PATENT DOCUMENTS

| | | | |
|---|---|---|---|
| 5,364,272 A | | 11/1994 | Herman et al. |
| 5,554,062 A | * | 9/1996 | Goldsen .............. A63F 9/0098 434/171 |
| 5,823,782 A | | 10/1998 | Marcus et al. |
| 5,991,693 A | | 11/1999 | Zalewski |
| 6,030,225 A | | 2/2000 | Chan |
| 6,884,075 B1 | | 4/2005 | Tropoloc |
| 7,050,754 B1 | | 5/2006 | Marcus et al. |
| 7,203,455 B2 | | 4/2007 | Ernst et al. |
| 7,357,321 B2 | | 4/2008 | Yoshida et al. |
| 7,993,139 B2 | * | 8/2011 | Lehmann ................ G09B 1/30 434/160 |
| 8,057,233 B2 | * | 11/2011 | Owen ..................... G09B 1/36 434/169 |
| 8,199,117 B2 | | 6/2012 | Izadi et al. |
| 10,607,502 B2 | | 3/2020 | Butler et al. |
| 10,825,352 B2 | | 11/2020 | Butler et al. |
| 2002/0090596 A1 | | 7/2002 | Sosoka et al. |
| 2002/0160340 A1 | | 10/2002 | Marcus et al. |
| 2004/0056781 A1 | | 3/2004 | Rix et al. |
| 2007/0003912 A1 | | 1/2007 | Freedman |
| 2008/0281851 A1 | | 11/2008 | Izadi et al. |
| 2009/0315258 A1 | | 12/2009 | Odom et al. |
| 2010/0005952 A1 | * | 1/2010 | LaMon ................ G09B 15/02 84/478 |
| 2010/0273133 A1 | | 10/2010 | Lehmann |
| 2012/0015341 A1 | | 1/2012 | Self et al. |
| 2012/0086877 A1 | | 4/2012 | Kaoh |
| 2012/0031561 A1 | | 12/2012 | Listim |
| 2013/0069908 A1 | | 3/2013 | Sung |
| 2013/0203022 A1 | | 8/2013 | Al-qudsi |
| 2013/0302763 A1 | | 11/2013 | Edwards et al. |
| 2013/0335109 A1 | | 12/2013 | Chen et al. |
| 2014/0234809 A1 | | 8/2014 | Colvard |
| 2014/0272818 A1 | * | 9/2014 | Carrasquillo-Garcia ............... A63F 3/0402 434/129 |
| 2015/0356881 A1 | | 12/2015 | Butler et al. |
| 2016/0035241 A1 | * | 2/2016 | Butler ................. G09B 17/003 434/113 |
| 2016/0210484 A1 | | 7/2016 | Shi et al. |
| 2016/0325197 A1 | | 11/2016 | Smith |

OTHER PUBLICATIONS

"U.S. Appl. No. 16/794,570, Examiner Interview Summary dated Jul. 30, 2021", 2 pgs.

"U.S. Appl. No. 16/794,570, Response filed Sep. 2, 2021 to Non Final Office Action dated Jun. 9, 2021", 13 pgs.

"U.S. Appl. No. 14/816,536, 312 Amendment filed Sep. 23, 2020", 5 pgs.

"U.S. Appl. No. 14/816,536, PTO Response to Rule 312 Communication dated Oct. 7, 2020", 2 pgs.

"U.S. Appl. No. 14/730,232, Examiner Interview Summary dated Apr. 9, 2019", 2 pgs.

"U.S. Appl. No. 14/730,232, Examiner Interview Summary dated Sep. 27, 2019", 3 pgs.

"U.S. Appl. No. 14/730,232, Final Office Action dated Feb. 26, 2019", 16 pgs.

"U.S. Appl. No. 14/730,232, Non Final Office Action dated Apr. 19, 2018", 16 pgs.

"U.S. Appl. No. 14/730,232, Non Final Office Action dated Jul. 15, 2019", 17 pgs.

"U.S. Appl. No. 14/730,232, Notice of Allowance dated Nov. 20, 2019", 17 pgs.

"U.S. Appl. No. 14/730,232, Response filed Feb. 19, 2018 to Restriction Requirement dated Sep. 19, 2017", 14 pgs.

"U.S. Appl. No. 14/730,232, Response filed Oct. 15, 2019 to Non-Final Office Action dated Jul. 15, 2019", 15 pgs.

"U.S. Appl. No. 14/730,232, Response filed Oct. 19, 2018 to Non Final Office Action dated Apr. 19, 2018", 19 pgs.

"U.S. Appl. No. 14/730,232, Response filed Jun. 7, 2019 to Final Office Action dated Feb. 26, 2019", 16 pgs.

"U.S. Appl. No. 14/730,232, Restriction Requirement dated Sep. 19, 2017", 6 pgs.

"U.S. Appl. No. 14/816,536, Corrected Notice of Allowability dated Sep. 3, 2020", 2 pgs.

"U.S. Appl. No. 14/816,536, Final Office Action dated Jan. 10, 2020", 16 pgs.

"U.S. Appl. No. 14/816,536, Non Final Office Action dated Sep. 20, 2017", 13 pgs.

"U.S. Appl. No. 14/816,536, Notice of Allowance dated Jul. 2, 2020", 8 pgs.

"U.S. Appl. No. 14/816,536, Response filed Feb. 18, 2018 to Non Final Office Action dated Sep. 20, 2017", 14 pgs.

"U.S. Appl. No. 14/816,536, Response filed Apr. 7, 2020 to Final Office Action dated Jan. 10, 2020", 7 pgs.

"U.S. Appl. No. 16/794,570, Preliminary Amendment filed Feb. 27, 2020", 3 pgs.

U.S. Appl. No. 14/730,232 U.S. Pat. No. 10,607,502, filed Jun. 3, 2015, Phonics Exploration Toy.

U.S. Appl. No. 16/794, filed Feb. 19, 2020, Phonics Exploration Toy.

U.S. Appl. No. 14/816,536, filed Aug. 3, 2015, Letter Manipulative Identification Board.

U.S. Appl. No. 17/545,019, filed Dec. 8, 2021, Phonics Exploration Toy.

"U.S. Appl. No. 16/794,570, Notice of Allowance dated Sep. 28, 2021", 8 pgs.

* cited by examiner

LETTER MANIPULATIVE IDENTIFICATION BOARD

CROSS-REFERENCE TO RELATED APPLICATIONS

The present application is a continuation of U.S. application Ser. No. 14/816,536, filed Aug. 3, 2015 and takes priority from Provisional App. No. 62/032,630, filed Aug. 3, 2014, and is a continuation in part of U.S. application Ser. No. 14/730,232, filed Jun. 3, 2015, which takes priority from Provisional App. No. 62/007,413, filed Jun. 4, 2014, which are herein incorporated by their reference.

BACKGROUND

Field of the Invention

The present invention is generally in the area of educational toys for children, and specifically relates to a system and method of teaching phonics involving physical manipulatives as well as software.

Description of Related Art

Children learning to read are often encouraged to use phonics to "sound out" letters in a word. This helps the child understand the sounds made by different letters and thus assimilate the rules of English spelling and pronunciation. Since children are physical learners and respond well to tactile stimulation, many manipulatives exist for the purpose of teaching reading—alphabet blocks, letter-shaped magnets, and other similar things. A child using such toys can learn the shape of the letters by touch as well as by sight and thus learn them better.

Many software games exist for the purpose of teaching children to read, but as mentioned, for optimal learning, it is desirable for such a software game to interact with a system involving physical letter manipulatives. A need therefore exists for a system that can interact with letter manipulatives, identify them, and communicate this information to a computing device.

SUMMARY OF THE INVENTION

An object of the present invention is to provide a system for identifying letter manipulatives and communicating the identification information to a computing device.

Another object of the present invention is to provide an educational toy that combines physical manipulatives with a software game.

The system of the present invention comprises a set of letter manipulatives, a letter identification board on which letter manipulatives can be placed, and an identification module for identifying which letter manipulatives are placed on the board.

In an embodiment, the identification module comprises a camera that is directed at the letter identification board. The camera is configured to take a photo of the letter identification board. The identification module also comprises a processor and memory configured to perform optical character recognition on the photo and thus identify any letters present on the letter identification board.

In an embodiment, each letter manipulative is a different color, and the identification module comprises three light source—red, blue, and green—and at least one sensor for determining how much light of each color is reflected from each letter manipulative. The identification module also comprises a processor and memory configured to identify the color of each letter manipulative, and use the color to identify each letter manipulative. In an embodiment, more than one color could be used on each letter, or a pattern could be used on each letter. The colors may be applied to the entire body of the letter or just to the bottom side (for this, the board has to be transparent or translucent).

In an embodiment, each letter manipulative comprises a RFID tag, and the identification module comprises a RFID reader. The letter manipulatives may also comprise optical identification tags such as bar codes or QR codes, and the identification module may comprise a reader that can read those codes.

In an embodiment, each letter manipulative comprises a resistor connected to two conductive pads, and the letter identification board comprises conductive pads that connect to the conductive pads on each letter manipulative. The identification module comprises a circuit for evaluating the resistance value of each letter manipulative connected to conductive pads on the letter identification board.

In an embodiment, each letter manipulative comprises a pattern of conductive pads on the bottom side of the letter manipulative, wherein the pattern is unique for each letter, with each conductive pad being covered with an insulating overlay. The letter identification board comprises a plurality of letter spaces, each letter space comprising a pattern of sensor bits, where each sensor bit is two conductive pads with a space between them where one conductive pad is grounded. When a letter manipulative is placed in a letter space, each conductive pad forms two series-connected parallel plate capacitors. The identification module comprises a circuit that measures the capacitance at each sensor bit to determine a pattern of capacitances, and a processor and memory that identifies the letter from the pattern of capacitances.

In an embodiment, the circuit that measures the capacitance at each sensor bit uses the charge transfer method to measure the capacitance.

In an embodiment, the pattern of sensor bits in each letter space is a 3×3 grid with one corner missing.

In an embodiment, the identification module further comprises a processor and memory configured to identify any change in capacitance above a predefined threshold. The predefined threshold is preferably higher than the change in capacitance obtained by pressing a finger on the sensor bit.

In the preferred embodiment, the letter manipulatives are shaped like the letters they represent. However, they can be rectangular or any other shape. In an embodiment, each letter manipulative comprises a Braille code for the letter it represents. In an embodiment, the letter manipulatives are translucent.

In an embodiment, the letter identification board may provide backlighting to make the game more entertaining for the child. The entire board may be backlit, or backlighting may only be provided in the letter spaces, as underlining, a dot, an outline, or the entire letter space.

LIST OF FIGURES

DETAILED DESCRIPTION

Figure 1:
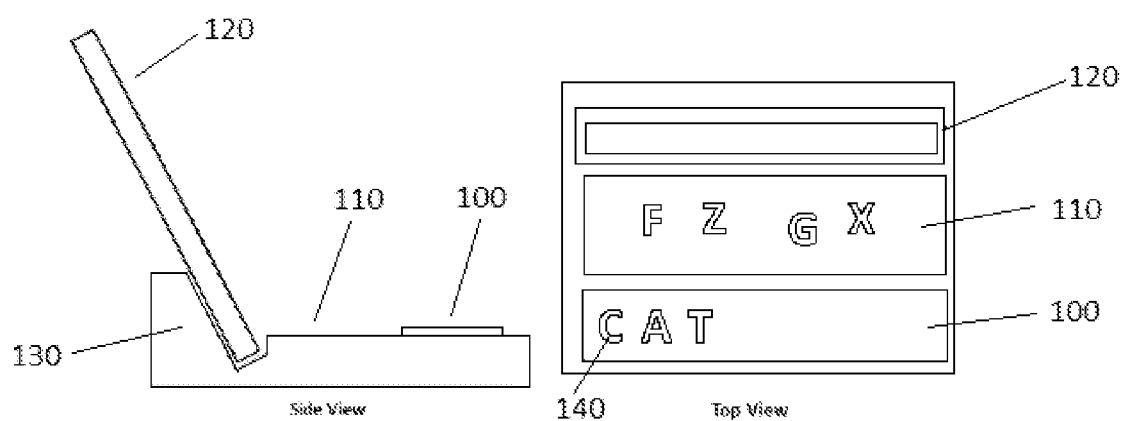
FIG. 1 shows a diagram of the preferred embodiment of the system of the present invention.

In its preferred embodiment, as shown in FIG. 1, the system of the present invention comprises a set of letter manipulatives 140, a letter identification board 100 for the placement of the letter manipulatives thereon, and an identification module (not shown) connected to a computing device 120 that can identify the letters placed on the letter identification board. In the preferred embodiment, the letter identification board also comprises a storage area 110 for unused letters, and a tablet support 130. However, it will be understood that both of those elements are optional.

The computing device, comprising a processor and memory, can be a computer, laptop, tablet, smartphone, or any other computing device that comprises a processor and memory and can interface with the identification module.

The letter manipulatives 140 are preferably shaped like actual letters to make the learning experience tactile as well as visual, and are preferably approximately 1.25"-1.5" in size. The letter manipulatives may also be shaped like rectangular tiles with three-dimensional letter protrusions on them, as alphabet blocks with letters on the faces, or in any other way that the letter can be perceived by a child. In an embodiment, the letter manipulatives may also be colored different colors, and/or may have different textures to make the learning experience even more sensory. For example, vowels may be colored differently from consonants. In another embodiment, the letter manipulatives may also comprise Braille patterns for the letter in question. The letter manipulatives are preferably made of a nontoxic and durable material that is safe for young children to use, such as plastic or wood. The letter manipulatives may comprise various means of attachment to the board, such as hook and loop fasteners, magnets, or snaps.

The letter identification board 100 is preferably a board that can easily accommodate a group of several letters and that comprises a letter identification module that can sense which letters are placed on the board and the relative position of the letters to each other. This sensing can be accomplished by several different methods. In the preferred embodiment, capacitance is used to determine which letters are located on the board, as described below.

In an embodiment, the letter identification board 100 has a backlit surface that illuminates each letter space so that a child knows where to place the letter. This can be an underline, a dot, the entire perimeter of the space, or the entire space. The letter manipulative may also be translucent or partially translucent so that they can glow when selected. The backlighting may also be used to illuminate particular letters; for example, letters that comprise compound consonants such as TH may be backlit, or silent letters may be backlit, depending on the needs of the user.

Figure 2:
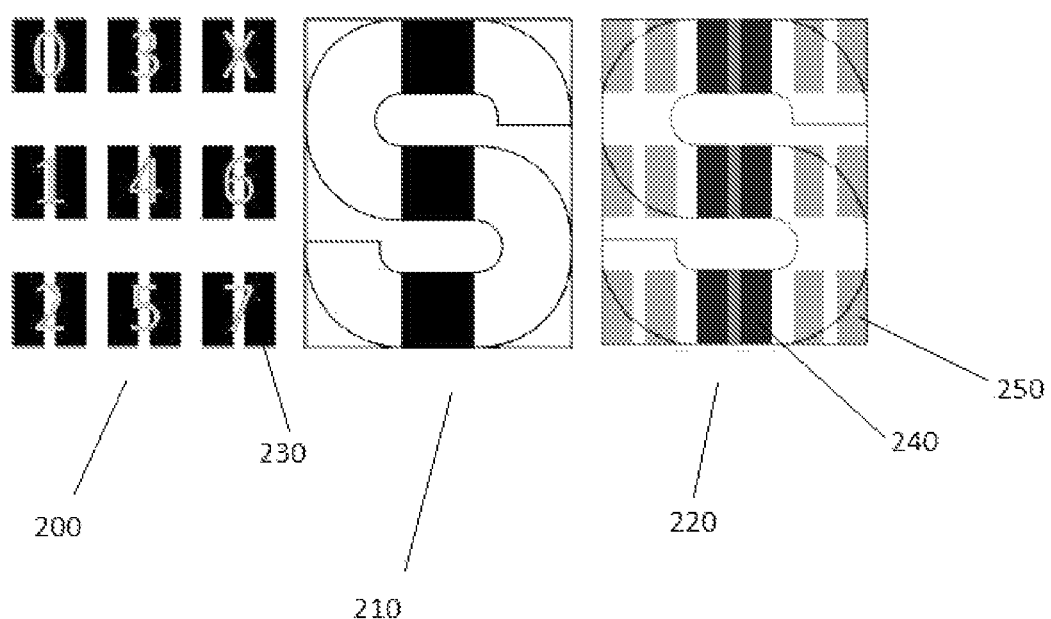
FIG. 2 shows the capacitive sensor system used in the preferred embodiment of the system of the present invention.

FIG. 2 shows the capacitive sensor system used in the preferred embodiment of the present invention. The letter identification board comprises eight letter readers arranged in a row. Each letter reader 200 has eight active and one inactive sensor bits arranged in a 3×3 grid, as shown; the inactive sensor bit is the upper right bit X. Each sensor bit comprises two adjacent copper pads 230 embedded to a certain depth into the surface of the sensor board. One of the copper pads is grounded and the other is connected to the sensor circuit. Each letter has a unique pattern of copper pads that is embedded into its bottom surface. One such letter 210 is shown in the Figure. When a letter is placed on the letter reader 220, each copper pad on the bottom of the letter creates two series-connected parallel plate capacitors (shown as 240), and the locations where there is no copper pad do not create any capacitors (shown as 250). The capacitive sensor system can then measure the capacitance at each of the eight sensor bits. Each sensor bit where a letter pad is present (indicated by a high capacitance reading) is assigned a "mark" and each sensor bit where a letter pad is not present (indicated by a low capacitance reading) is assigned an "unmark". The unique pattern of marks and unmarks generates an 8-bit number that can then be decoded by the computing device to determine which letter is present, as well as its orientation.

The sensing pads on the letter identification board are preferably covered by a very thin layer of high-dielectric material that helps protect the pads and helps form the capacitors. This can be done by either placing a thin plastic sheet across all the pads, or by a full plane silkscreen over the entire area of the pads. The second is preferable, since it is cheaper and adds no new process to the PCB manufacturing process.

Figure 2A:
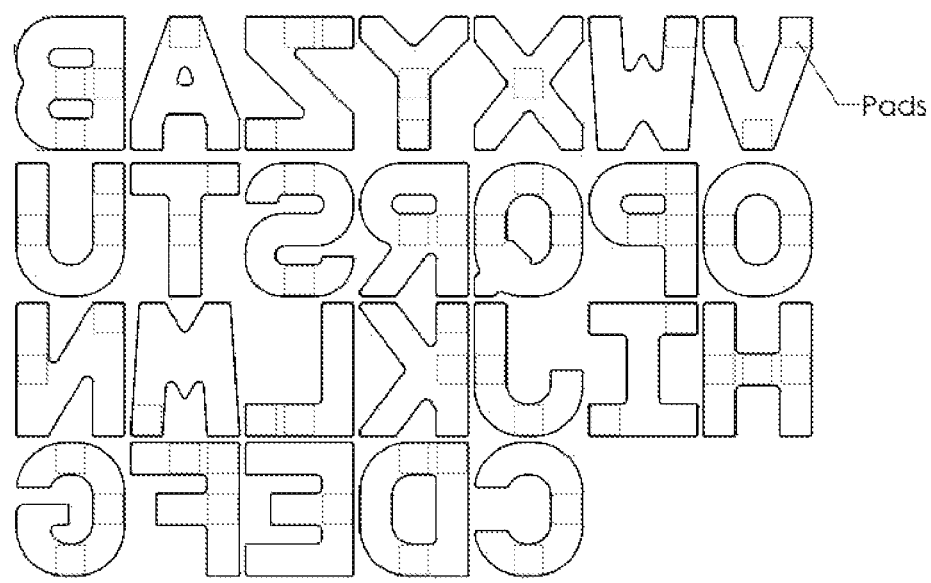
FIG. 2A shows a sample set of letter manipulatives used in the preferred embodiment of the system of the present invention.

FIG. 2A shows the preferred embodiment of the pad patterns on the letters. In the preferred embodiment, fewer pads are used for vowels and frequently-used letters (for example, E uses only one pad). The font shape is chosen so that a unique pad pattern can be used for each letter. The pads on the letters may be created by an adhesive label with conductive ink that is adhered to the back of the letter, conductive paint painted onto the back of the letters, conductive ink printed onto the back of the letters, or any other method. In the preferred embodiment, the font shapes used in the app are the same as the font shape of the letter manipulatives, to minimize confusion. Also, as shown in FIG. 2A, the letter manipulatives are preferably shaped like the letters they represent, to maximize tactile learning for the child. The shape of the letters is preferably such as to accommodate the conductive pads.

Figure 3:
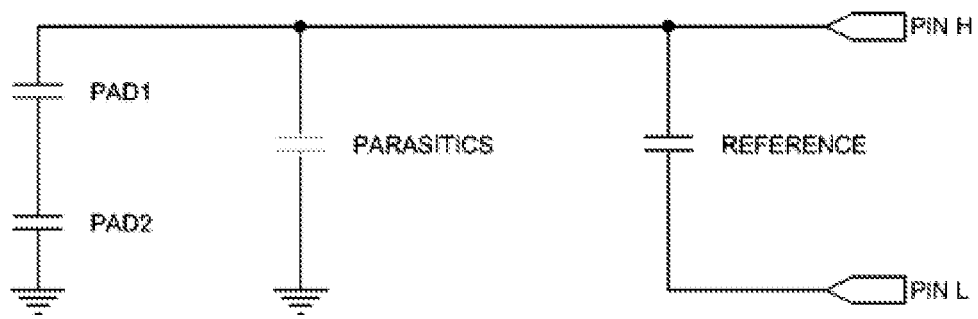
FIG. 3 shows a simplified schematic of the sensor circuit used in the capacitive sensor system.

The capacitive sensing system uses the charge transfer method of capacitance measurement. To do that, one repeatedly charges an unknown capacitance and then transfer the charge to a reference capacitor of known value. The number of charge transfer cycles required to raise the reference capacitor's voltage to a given value is related to the unknown capacitance. FIG. 3 shows a simplified schematic of the sensor circuit used to measure a single sensor bit. PAD1 and PAD2 are the two series connected parallel plate capacitors created by a letter pad present over the sensor bit. The equation for the capacitance of a parallel plate capacitor is given by $$C = \varepsilon_r \varepsilon_0 \frac{A}{d},$$

where A is the area of the sensor bit pad, d is the approximate separation of the plates, and $\varepsilon_r$ is the relative permittivity of plastic. In the preferred embodiment, $\varepsilon_r=3$, A is 33.31 mm$^2$, and d=0.051 mm. Thus, the approximate capacitance of each one of the PAD1 and PAD2 capacitors will be 17.3 pF, and their combined capacitance in series will be 8.65 pF. When there is no letter pad present over the sensor bit, the capacitance is negligible. The parasitic capacitance is due to layout geometry and ICs in the signal path, and can vary from sensor bit to sensor bit; experimentally, the parasitic capacitance was found to be around 100-200 pF. The reference capacitor is a ceramic capacitor with a capacitance much greater than the unknown plus the parasitic capacitance. A larger reference capacitor will provide a higher resolution, but require a longer time to perform the measurement. Experimentally, a value of 22 nF was found to be a good compromise between speed and resolution.

Figure 4:
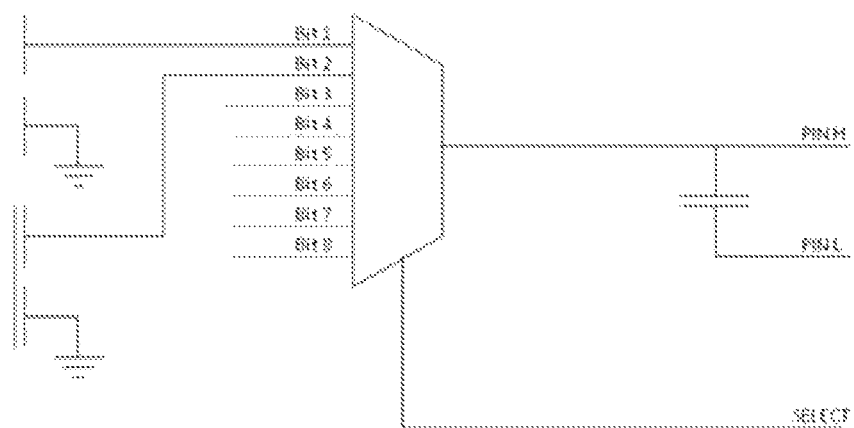
FIG. 4 shows a circuit diagram of the preferred embodiment of the capacitive sensor.

FIG. 4 shows a circuit diagram for the preferred embodiment of the capacitive sensor. Pin H and pin L are made to output a low (0V) voltage. To measure the capacitance, first the counter is set to 0. The unknown capacitance is charged, and then the reference capacitor is disconnected from the circuit by making pin L high impedance (making it an input). Pin H is made to output a high (3.3V) voltage. The charge is transferred to the reference capacitor, and pin H is made high impedance. The reference capacitor is reconnected to the circuit by making pin L output a low voltage. The counter is incremented by 1. If the voltage on pin H is greater than $V_{IH}$, the value of counts representing the capacitance is recorded; if not, the charge and transfer process is repeated. The number of counts is then used to indicate the capacitance of the unknown capacitor, and therefore, whether there is a "mark" or an "unmark".

It will be understood that while the preferred embodiment uses copper pads to accomplish its purpose, any other conductive material is also usable for this purpose, as long as the pads made with the conductive material can form a capacitor.

Figure 5:
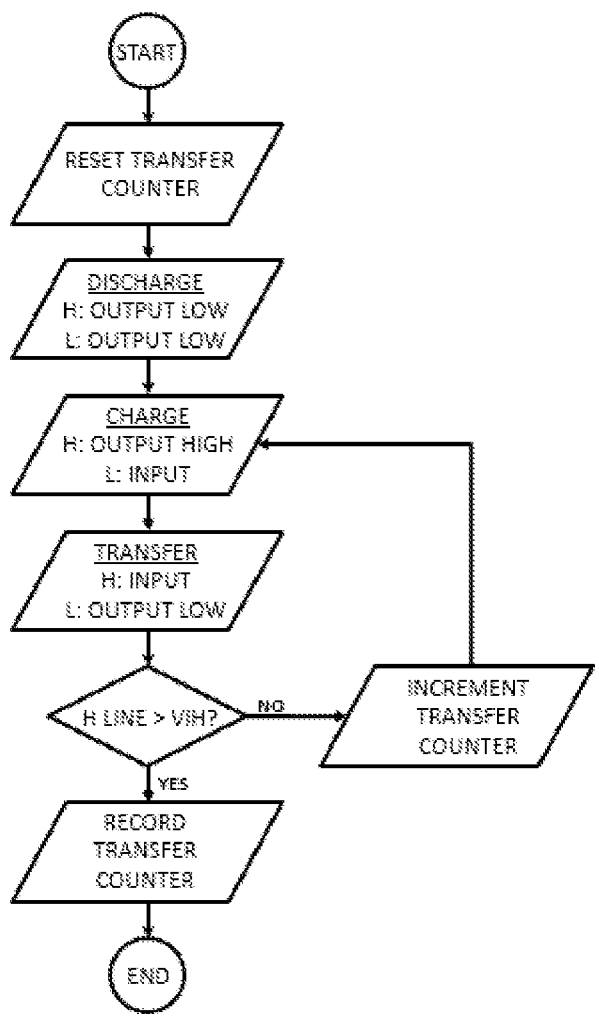
FIG. 5 shows a flowchart of the process of evaluating the capacitance of each of the eight sensor bits.

FIG. 5 shows a flowchart of the process of evaluating the capacitance of each of the eight sensor bits. As shown, the transfer counter is reset, then the capacitors are discharged by setting the H and L outputs low. Then, the unknown capacitor is charged; the charge is transferred to the reference capacitor; and the output of the H line is compared to $V_{IH}$. If it is not greater than $V_{IH}$, the counter is incremented by 1 and these steps are repeated. If it is greater than $V_{IH}$, the value of the counter is recorded.

The letter identification module needs to also be able to determine when a letter is placed on the board or removed. If the value of the capacitance changes by a significant amount, the system concludes that a letter was placed or removed and goes through the reading process. If the capacitance changes by less than the threshold, the system ignores it—a finger touch can register a capacitance, but it will be less than the conductive pad. Furthermore, if a letter is placed on the board upside-down, the material of the letter manipulative itself (plastic or wood) will cause the sensor area to register a change in capacitance, but it will still be smaller than the change caused by having a conductive pad placed on the board. The change in capacitance is continuously evaluated and the accumulated delta is tracked.

Figure 6:
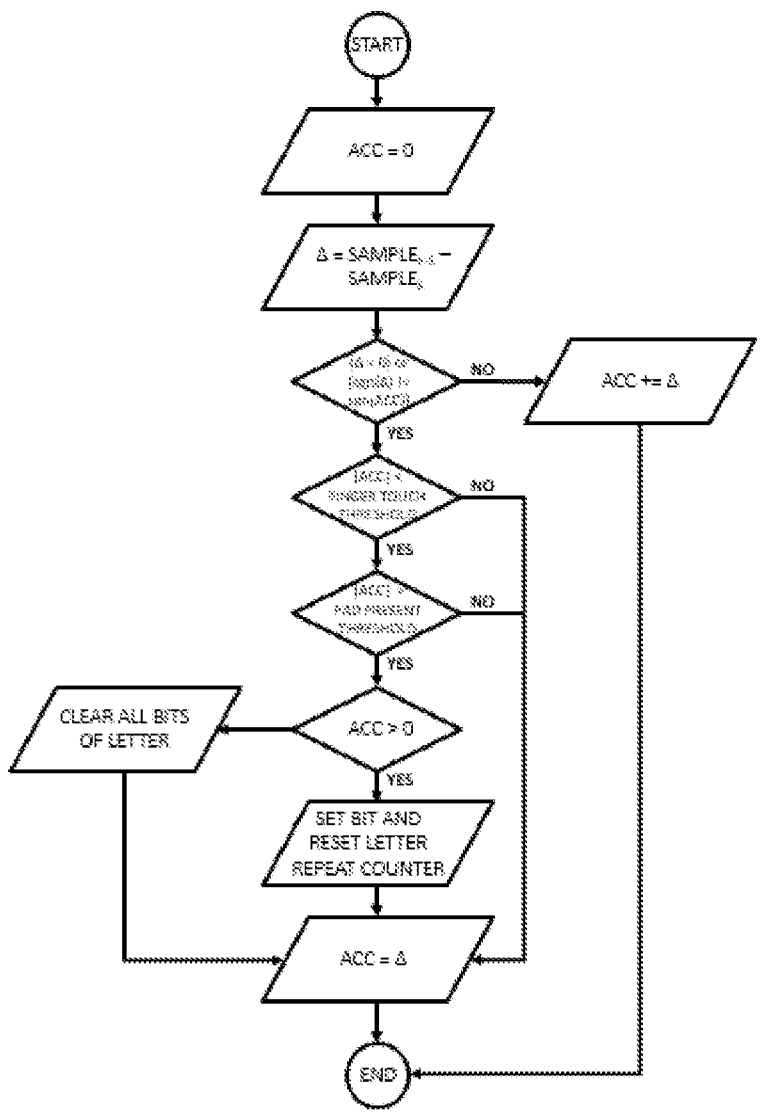
FIG. 6 shows a flowchart for determining when a letter was placed or removed on the board.

FIG. 6 shows a flowchart for determining when a letter was placed or removed on the letter identification board. Acc is the accumulated deltas of the capacitance.

The above is the preferred embodiment for the letter identification module. However, other embodiments are also possible, as described below. Furthermore, embodiments that are not described, but are apparent to one of reasonable skill in the art, are also encompassed by the present invention.

In an alternate embodiment, the letter identification board comprises a transparent or semi-transparent board on which letters may be placed, and at least one camera placed underneath the board (i.e. on the opposite side from the side on which the letters are placed) in a position that would enable the camera to get an image of the underside of the board and any letters placed on it. The image is then transmitted to the computing device by means of a cable or wirelessly (preferably by Bluetooth), and an OCR program on the computing device determines which letters have been placed on the board and what their relative position is with respect to each other.

In another embodiment, the letter identification board uses color to identify what letters are placed on the board. In that embodiment, each letter is assigned a unique color. When the child places the letters on the board, each letter is briefly illuminated with three different colors (RGB) and a photo diode determines how much light is reflected in each color. The unique RGB combination is then used to identify the letter. The illumination and analysis is preferably provided by LED's and a photo diode located on the top or sides of the board. In an embodiment, more than one color could be applied to the letter, which can be applied in a pattern.

Other embodiments may use other ways of identifying the letters. For example, each letter may have an embedded RFID tag, or a bar code or QR code, that is then read by a reader located within the letter identification board. In another embodiment, each letter may have a built-in resistor and the board may comprise conductive pads; the total resistance of all the letters may then be used to deduce which letters are on the board.

The letter identification board may also provide for an attachment mechanism that allows the letters to be securely attached to the board—for example, Velcro or magnets.

Once the letters are placed on the letter identification board and sensed, the sensor information is sent to the computing device. The computing device is preferably a tablet such as an iPad or an iPad Mini, but may also be any other tablet, smartphone, or computer, as long as it comprises at least a display and a speaker. The computing device preferably connects to the letter identification module by Bluetooth, but may also be connected by a cable, by wi-fi, or by any other connection.

The system of the present invention may be used with any game or educational software that can be run on a computing device. For example, it may be used with a spelling game that requires a child to spell various words; a phonics exploration game that provides pronunciations for words provided by the child; or any other game that requires a child to manipulate letter manipulatives to provide input.

Exemplary embodiments have been described above. It will, however, be clear to a person of reasonable skill that the invention encompasses other embodiments, which also fall into the scope of the present invention.

What is claimed is:

1. A system comprising:
    a set of manipulatable letters; and
    a letter identification device configured to receive one or more manipulatable letters from the set of manipulatable letters, the letter identification device comprising:
        a color sensor configured to determine an amount of colored light reflected by a manipulatable letter from the set of manipulatable letters, the manipulatable letter being received by the letter identification device; and
        one or more processors configured to perform operations comprising:

identifying the received manipulatable letter based on the determined amount of colored light reflected by the manipulatable letter.

2. The system of claim 1, wherein:
the color sensor of the letter identification device comprises at least one of a red light sensor, a green light sensor, or a blue light sensor.

3. The system of claim 1, wherein:
the identifying of the received manipulatable letter is based on at least one of a determined first amount of red light reflected by the received manipulatable letter, a determined second amount of green light reflected by the received manipulatable letter, or a determined third amount of blue light reflected by the received manipulatable letter.

4. The system of claim 1, wherein:
the letter identification device further comprises a light source of the colored light; and
the color sensor is configured to determine the amount of the colored light reflected by the received manipulatable letter from the light source to the color sensor.

5. The system of claim 4, wherein:
the light source of the colored light comprises at least one of a red light source, a green light source, or a blue light source.

6. The system of claim 4, wherein:
the color sensor is configured to determine at least one of a first amount of red light reflected by the received manipulatable letter, a second amount of green light reflected by the received manipulatable letter, or a third amount of blue light reflected by the received manipulatable letter.

7. The system of claim 1, wherein:
each manipulatable letter in the set of manipulatable letters has a corresponding bottom surface with a corresponding color unique to that manipulatable letter among the set of manipulatable letters.

8. The system of claim 7, wherein:
the identifying of the received manipulatable letter is based on the corresponding color of the corresponding bottom surface of the received manipulatable letter.

9. The system of claim 1, wherein:
the letter identification device comprises one or more receptacles configured to receive one or more manipulatable letters from the set of manipulatable letters; and
the letter identification device comprises a camera aimed at the one or more receptacles of the letter identification device.

10. The system of claim 1, wherein:
the letter identification device is further configured to communicatively couple with a computing device; and
the operations for which the one or more processors of the letter identification device are configured to perform further comprise:
communicating an identity of the identified manipulatable letter to the computing device.

11. A letter identification device comprising:
one or more receptacles configured to receive one or more manipulatable letters from a set of manipulatable letters;
a color sensor configured to determine an amount of colored light reflected by a manipulatable letter from a set of manipulatable letters, the manipulatable letter being received by a receptacle among the one or more receptacles; and
one or more processors configured to perform operations comprising:
identifying the received manipulatable letter based on the determined amount of colored light reflected by the manipulatable letter.

12. The letter identification device of claim 11, wherein:
the color sensor comprises at least one of a red light sensor, a green light sensor, or a blue light sensor.

13. The letter identification device of claim 11, wherein:
the identifying of the received manipulatable letter is based on at least one of a determined first amount of red light reflected by the received manipulatable letter, a determined second amount of green light reflected by the received manipulatable letter, or a determined third amount of blue light reflected by the received manipulatable letter.

14. The letter identification device of claim 11, further comprising:
a light source of the colored light; and wherein:
the color sensor is configured to determine the amount of the colored light reflected by the received manipulatable letter from the light source to the color sensor.

15. The letter identification device of claim 14, wherein:
the light source of the colored light comprises at least one of a red light source, a green light source, or a blue light source.

16. The letter identification device of claim 14, wherein:
the color sensor is configured to determine at least one of a first amount of red light reflected by the received manipulatable letter, a second amount of green light reflected by the received manipulatable letter, or a third amount of blue light reflected by the received manipulatable letter.

17. The letter identification device of claim 11, wherein:
each manipulatable letter in the set of manipulatable letters has a corresponding bottom surface with a corresponding color unique to that manipulatable letter among the set of manipulatable letters.

18. The letter identification device of claim 17, wherein:
the identifying of the received manipulatable letter is based on the corresponding color of the corresponding bottom surface of the received manipulatable letter.

19. The letter identification device of claim 11, further comprising:
a camera aimed at the one or more receptacles of the letter identification device.

20. The letter identification device of claim 11, further comprising:
a communication interface configured to communicatively couple with a computing device; and wherein:
the operations further comprise:
communicating an identity of the identified manipulatable letter to the computing device.

* * * * *

UNITED STATES PATENT AND TRADEMARK OFFICE
CERTIFICATE OF CORRECTION

PATENT NO. : 11,386,802 B2
APPLICATION NO. : 17/027784
DATED : July 12, 2022
INVENTOR(S) : Butler et al.

It is certified that error appears in the above-identified patent and that said Letters Patent is hereby corrected as shown below:

On the Title Page

On page 2, in Column 1, under "U.S. Patent Documents", Line 29, delete "2012/0031561" and insert --2012/0315610-- therefor In the Specification In Column 1, Line 66, delete "source" and insert --sources-- therefor In the Claims In Column 7, Line 4, in Claim 2, delete "claim I," and insert --claim 1,-- therefor In Column 7, Line 42, in Claim 9, delete "claim I," and insert --claim 1,-- therefor Signed and Sealed this
Sixteenth Day of May, 2023

Katherine Kelly Vidal
*Director of the United States Patent and Trademark Office*